United States Patent Office 3,363,975
Patented Jan. 16, 1968

3,363,975
PROCESS FOR DESCALING SEA WATER
Maria G. Dunseth, Phoenix, and Murrell L. Salutsky, Silver Spring, Md., assignors, by direct and mesne assignments, of one-half to W. R. Grace & Company, New York, N.Y., and one-half to the United States of America as represented by the Secretary of the Interior
No Drawing. Filed Jan. 21, 1965, Ser. No. 427,191
8 Claims. (Cl. 23—107)

ABSTRACT OF THE DISCLOSURE

Brines containing calcium, magnesium and potassium are treated in a two step process which removes calcium and magnesium (descales) and allows recovery of the potassium through the formation of a phosphate products according to the following reactions:

(1) Brine+Ca(H$_2$PO$_4$)$_2$H$_2$O+NaOH→ 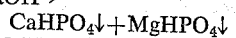
 CaHPO$_4$↓+MgHPO$_4$↓
(2) Filtrate from (1)+NaOH→MgKPO$_4$.↓ 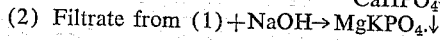

---

The invention herein described and claimed may be manufactured and used by or for the Government of the United States of America for governmental purposes without the payment of royalties thereon or therefor.

This invention relates to descaling of brines such as sea water and recovery of potassium therefrom.

Numerous salt water brines, such as sea water, contain substantial amounts of various valuable elements such as potassium, calcium, magnesium, etc. As the available supply of these chemicals from other sources dwindles or becomes more expensive, interest in the use of brines as raw material sources has increased. Potash, in particular, is widely used in the chemical industry for production of many chemicals, particularly fertilizers. Recovery of potassium from sea water would represent a valuable additional source of this chemical.

In addition, removal of calcium and magnesium (descaling) from brines is desirable in preparing a water, such as boiler water, which can be evaporated at elevated temperatures without scale formation.

It is therefore an object of this invention to provide a method for descaling brines containing magnesium and calcium, as well as potassium, and for recovery of potassium from the descaled brine.

It has now been found that this objective may be accomplished by means of a two-step process in which the brine is first treated with monocalcium phosphate monohydrate, Ca(H$_2$PO$_4$)$_2$·H$_2$O, and alkali to precipitate calcium and magnesium as phosphates. After separation of the precipitates, as by filtration, the residual solution is treated with additional alkali to precipitate potassium essentially as magnesium potassium phosphate. The reactions taking place in the process of the invention are illustrated in the following schematic equations in which the alkali is caustic soda:

(1) Brine+Ca(H$_2$PO$_4$)$_2$·H$_2$O+NaOH→ 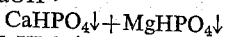
 CaHPO$_4$↓+MgHPO$_4$↓
(2) Filtrate from (1)+NaOH→MgKPO$_4$↓ 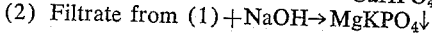

The invention is particularly applicable to sea water; however, other brines containing calcium or magnesium and potassium, e.g., inland saline waters, oil well brines, etc., can also be used.

The amount of Ca(H$_2$PO$_4$)$_2$·H$_2$O employed should be sufficient to substantially remove any calcium and magnesium from the brine, i.e., the stoichiometric amount, and will therefore vary with the concentration of these elements in the brine. For some purposes, however, complete removal of all calcium and magnesium may not be necessary. Optimum amounts of Ca(H$_2$PO$_4$)$_2$·H$_2$O will, therefore, be best determined empirically for the particular use to be made of the descaled water. Amounts of calcium and magnesium in sea water can be readily determined by use of the chlorinity ratios which, for all practical purposes, are constants. The best values for chlorinity ratios are shown by Barnes, "Analysis of Sea Water," The Analyst, vol. 80, August 1955, page 578. Total chlorine content of the sea water to be treated can be readily determined by the standard Mohr or Volhard methods (Cf. Barnes, supra, at page 579). As a first approximation it is known that analyses of sea water have shown that the average concentrations of calcium and magnesium are about 400 and 1200 parts per million, respectively. The magnesium and calcium content of other brines that can be used in the process of this invention are readily determined by known analytical procedures.

In the first step of the process alkali is added in an amount sufficient to raise the pH to within a range of from about 7.5 to about 9.5. Optimum pH value will vary with concentrations of calcium and magnesium as well as other constituents in the brine and is also best determined empirically. Although caustic soda has been found to give very good results, other alkalis such as soda ash or sodium carbonate, magnesium hydroxide, ammonium hydroxide, etc., may be used. However, the use of potassium bases is less desirable since it results in formation of more potassium ions in the brine. A mixture of sodium hydroxide and sodium chloride, from electrolysis of a sodium chloride brine, may be used if desired.

After settling and filtration of the precipitated mixture of CaHPO$_4$ and MgHPO$_4$, the filtrate is treated with additional alkali to provide a pH of about 9.5 to 10.0 and to form a precipitate consisting essentially of magnesium potassium phosphate. This product contains a high percentage of K$_2$O and is of particular value as a fertilizer. Again the preferred alkali is caustic soda, although other alkalis may be used as in the first step of the process. The effluent solution from this second precipitation is descaled sea water.

The process of the invention will be more specifically illustrated by the following example.

Example

In two experiments, 139.75 and 125.77 grams of monocalcium phosphate monohydrate were added to 10 liters of sea water in a flask. These quantities represent respectively 100% and 90% of the stoichiometric amount of phosphate required to react with both the calcium and magnesium present in sea water. Next, a 10 N sodium hydroxide solution was added until the pH of the solution was 7.5. The slurry was filtered and the cake dried at 90° C. The filtrate was further neutralized with 10 N sodium hydroxide solution to pH 10.0. The slurry was filtered and the filter cake was dried at 90° C. A Beckman pH meter with slurry type electrodes was utilized to follow the pH changes during the neutralization. The slurry was agitated during the neutralization and for a 30-minute digestion following the second precipitation.

In Table 1 can be seen the analyses of the two precipitates obtained in each of the two experiments. A high analysis K$_2$O product (up to 9% K$_2$O) was obtained by the second precipitation. A higher percentage recovery of P$_2$O$_5$ was obtained when only 90% of the stoichiometric amount of phosphate was used.

TABLE 1.—RECOVERY OF POTASSIUM FROM SEA WATER BY PRECIPITATION WITH MONOCALCIUM PHOSPHATE MONOHYDRATE

| | Wt. of Ca(H$_2$PO$_4$)$_2$·H$_2$O Added | | | |
|---|---|---|---|---|
| | 139.75 g. | | 125.77 g. | |
| | 1st step precipitation | 2nd step precipitation | 1st step precipitation | 2nd step precipitation |
| Final pH | 7.5 | 10.0 | 7.5 | 10.0 |
| Wt. of precipitate (after drying) | 120.1 | 53.25 | 121.4 | 42.9 |
| Composition of Precipitate: | | | | |
| Percent P$_2$O$_5$ | 41.10 | 42.30 | 40.80 | 42.40 |
| Percent MgO | 3.04 | 25.30 | 6.34 | |
| Percent CaO | 29.25 | 0.60 | 26.52 | |
| Percent K$_2$O | 0.08 | 5.77 | <0.01 | 8.00 |
| Weight Recovered, g.: | | | | |
| P$_2$O$_5$ | 49.36 | 22.52 | 49.53 | 18.18 |
| Mg | 2.20 | 8.12 | 4.63 | |
| Ca | 25.09 | 0.22 | 23.14 | |
| K | 0.07 | 2.54 | | 3.43 |
| Recovery (Percent): | | | | |
| P$_2$O$_5$ | 62.70 | 28.60 | 69.91 | 25.66 |
| Mg | 19.43 | 71.73 | 40.90 | |
| Ca | 97.39 | 0.80 | 98.30 | |
| K | 2.00 | 76.04 | | 102 |
| Residual (p.p.m.)*: | | | | |
| Mg | | | | 6 |
| Ca | | <4 | | <4 |
| K | | 82 | | 41 |

*Residual in filtrate after 2nd step precipitation.

What is claimed is:

1. A method for descaling and recovering a phosphate product containing potassium from brines containing calcium magnesium and potassium comprising the steps of (1) treating the brine with an amount of monocalcium phosphate monohydrate and an alkali sufficient to provide a pH of about 7.5 to 9.5 and cause precipitation of calcium and magnesium as phosphates, separating the precipitated phosphates of calcium and magnesium and (2) adding to the residual aqueous solution additional alkali in an amount to provide a pH of from about 9.5 to 10.0 and precipitate a phosphate product having a high percentage of K$_2$O.

2. The method of claim 1 in which the brine is sea water.

3. The method of claim 1 in which the amount of monocalcium phosphate monohydrate is the stoichiometric amount sufficient to substantially completely precipitate calcium and magnesium from the brine.

4. The method of claim 1 in which the alkali added in step (1) is caustic soda.

5. The method of claim 1 in which the alkali added in step (1) is sodium carbonate.

6. The method of claim 1 in which the precipitated phosphates of calcium and magnesium are separated by filtration.

7. The method of claim 1 in which the alkali added in step (2) is caustic soda.

8. The method of claim 1 in which the alkali added in step (2) is sodium carbonate.

References Cited

UNITED STATES PATENTS

| | | | |
|---|---|---|---|
| 2,977,189 | 3/1961 | Ladenburg et al. | 23—89 |
| 2,606,839 | 8/1952 | Evans | 99—143 |
| 3,147,072 | 9/1964 | Thomsen | 23—42 |
| 3,205,013 | 9/1965 | Miller et al. | 299—5 |

FOREIGN PATENTS 1,209,562   1/1966   Germany.

OSCAR R. VERTIZ, *Primary Examiner.*

L. A. MARSH, *Assistant Examiner.*